(12) United States Patent
Silva et al.

(10) Patent No.: US 8,967,933 B2
(45) Date of Patent: Mar. 3, 2015

(54) FAST EXTRACTION THREADED NUT

(76) Inventors: Alejandro Gutierrez Silva, Santiago (CL); Alberto Monsalve Gonzalez, Santiago (CL); Jose Antonio Vallejo Rodriquez, Santiago (CL)

( * ) Notice: Subject to any disclaimer, the term of this patent is extended or adjusted under 35 U.S.C. 154(b) by 1053 days.

(21) Appl. No.: 12/478,444

(22) Filed: Jun. 4, 2009

(65) Prior Publication Data

US 2010/0098514 A1 Apr. 22, 2010

(30) Foreign Application Priority Data

Oct. 16, 2008 (CL) .................................. 3069-2008

(51) Int. Cl.
*F16B 37/00* (2006.01)
*F16B 37/08* (2006.01)

(52) U.S. Cl.
CPC ................................ *F16B 37/0828* (2013.01)
USPC ............................................. 411/427; 411/2

(58) Field of Classification Search
USPC .......... 411/1, 2, 242, 427, 525, 526, 937, 433
See application file for complete search history.

(56) References Cited

U.S. PATENT DOCUMENTS

| 168,597 | A | * | 10/1875 | Atwood | 411/280 |
| 1,302,854 | A | * | 5/1919 | Redmer | 411/427 |
| 1,586,725 | A | * | 6/1926 | Westinghouse et al. | 285/279 |
| 2,289,309 | A | * | 7/1942 | Van Winkle, Jr. | 411/280 |
| 2,314,780 | A | * | 3/1943 | Gade | 411/277 |
| 2,418,070 | A | * | 3/1947 | Green | 470/19 |
| 2,858,726 | A | * | 11/1958 | Zimmerschied et al. | 411/434 |
| 3,140,636 | A | * | 7/1964 | Grimm | 411/427 |
| 3,299,767 | A | * | 1/1967 | Royer | 411/433 |
| 4,007,564 | A | * | 2/1977 | Chisholm | 52/98 |
| 4,052,826 | A | * | 10/1977 | Chisholm | 52/98 |
| 6,305,890 | B1 | * | 10/2001 | Okamura | 411/431 |
| 6,910,826 | B1 | * | 6/2005 | Damiano | 403/2 |
| 2007/0243044 | A1 | * | 10/2007 | Chen | 411/427 |

* cited by examiner

*Primary Examiner* — Victor Batson
*Assistant Examiner* — Caroline L Natirboff
(74) *Attorney, Agent, or Firm* — Thomas W. Tolpin

(57) ABSTRACT

The present invention relates to a fast extraction threaded nut intended to be used on a threaded bolt or male member wherein the fast extraction threaded nut comprises at least an outer face and an axial bore as to allow insertion of a male member or like, wherein the fast extraction threaded nut and the threaded bolt have tightening means with common geometry, and the fast extraction threaded nut and the threaded bolt or male member are intended to join or connect two elements that need to be attached or coupled to each other, wherein the fast extraction threaded nut comprises in at least the outer face a notch of variable section and the notching is formed by at least two faces wherein the maximum cross-section of the notch is positioned in the outer area and the minimum section is positioned prior to the axial bore at such a distance that allows for the generation of an increase area which extensively grows until reaching the inner surface of the axial bore where the common tightening means is formed thus generating the split of the fast extraction threaded nut.

11 Claims, 7 Drawing Sheets

FAST EXTRACTION THREADED NUT

BACKGROUND OF THE INVENTION

The present invention refers to a threaded nut or device of rapid release which allows connecting two different components through a screw or bolt or device and the threaded nut. The objective of the invention is to remove the threaded nut or device from a threaded bolt or device as faster as possible without conducting the typical action of unscrewing which is the current practice.

The present invention relates to a fast extraction threaded nut or device which allows removal of the threaded nut or device in a prompt and efficient manner for applications in the mining industry, in particular to attach lining casing of mills. More specifically, this invention refers to a medium of mechanic articulation similar to a typical threaded nut or device where certain notches have been made which weaken the threaded nut or device only when the nut is removed and the articulation allows the nut to be completely operational when in use. The removal process of the threaded nut or device is accordingly faster and the process might take 5 seconds depending on the tool used to notch the threaded nut or like. It should be noted that the benefits provided by a rapid removal action consists of increasing the availability of the equipment. At present a SAG mill with a 40' diameter (12192 mm) and 20' length has a 90% availability and more, it processes approximately 100,000 TPD (tons per day), which provides approximately US$ 100,000 per hour of production. Replacement of lining includes an average amount of 30 hours in activities, and 10 of these 30 hours are spent to remove the bolts or threaded nuts. It would be then beneficial to reduce such time by using a threaded nut or device of rapid removal as it would increase availability in at least 5 hours with a subsequent increase in production amounting to approximately US $500,000, when linings are changed once or twice during the year.

Normal operation of a threaded nut (when connecting two components that are intended to maintain connected) generates in a functional way a stress field of compressive nature in virtually all the threaded nut or device. Such condition of compression stress prevents stress concentrators from presenting a risk condition which can destroy the threaded nut or device as it is not possible to propagate the extension of a crack inside a field of compression stress. The aforementioned has been tested both at experimental level by conducting a series of experiments which considered the geometric variables of the notching and material variations (different alloys and shape of the threaded nut or device) and also by simulations conducted based on the method of finite elements. The dimensions of the notching are the main characteristics which make the threaded nut or device rapidly removable. Measurements for depth (see magnitude B in FIG. 2) and thickness (see magnitude A in FIG. 2), angles of notching (see magnitude C in FIG. 2) which when placed on an antagonistic position and are subject under the action of wedges allow cracking of threaded nut or device of rapid removal by separating such nut into two or more parts as shown in FIGS. 4 and 5.

In order to improve the performance of the threaded nut or device several different alloys and geometries have been tested as well as other accessories have been added allowing the threaded nut or device to be affixed in a safe position when in operation. In consequence, this system for connection has the characteristic of not becoming loose or breaking when in operation and provides a rapid separation during the removal process thus becoming an innovative manner of decreasing the time to replace linings for any given mill.

In the art, patent GB 767882 discloses a threaded nut or device jointly shaped with a washer. In one side of the nut, a pair of radial walls extends toward the edge of the washer. Both walls provide a rectangular radial slot opened in the inner portion of the threaded nut or device, that is, both the nut or device and the washer are divided by that slot. The washer has a line of weakness in the opposite side of the slot. This threaded nut or device is intended for use in bathroom and kitchen devices and equipment as when such devices are rusted rendering very difficult removal of the threaded nut or device. Then through a radial leveraging in the radial slot the threaded nut or device is broken in the line of weakness thus repairs can be made in such equipment without any problems. In this case, the threaded nut or device and the washer are jointly conformed and also present one side which is completely opened with the slot in the radial direction while on the other side they have a line of weakness in the axial direction. When tightening the threaded nut or device during assembly it tends to open as a result from the slot, thus ceasing in its objective of providing a point of union to the parts that are affixed. This threaded nut or device is designed to endure lesser tightening and to be used in equipment for kitchen and bathrooms and it can not be applied to mobile devices subject to greater loads and stress during their operation and use.

U.S. Pat. No. 5,139,381, describes a system for rapid push-on mounting of a piece which is equivalent to a slide fit nut to be placed on a threaded bolt or the like whereas the device comprises three pieces wherein two of them have external hexagonal shape and one of these two pieces has a cylindrical array bore where the third piece is inserted, and wherein such third piece is divided into four threaded parts matching the threaded bolt. The system is rapidly disengaged when rotating the upper part of the piece connecting the portions of the cylindrical piece which are radially disengaged, thus detaching from the threaded bolt and thus it is not necessary to rotate the element using a wrench as to remove the slide fit nut wherein it can be extracted by pulling upward without any difficulty.

U.S. Pat. No. 6,406,240 B, describes a system similar to the previous one but in this case the cylindrical bore threaded coupling the bolt is divided in three cams that move in radial direction disengaging from the thread when the upper portion is axially moved through rotation applied to the hexagonal head and is different to the previous patent as the second cam of the threaded nut does not have an external hexagonal head.

It should be noted that all inventions related to rapid extraction have in common the use of more than three pieces as to achieve the objective. In this case in the present invention, and which is the novelty element, is that there is only one element acting with the bolt. This is a really differentiating factor compared to the other systems proposed which makes possible to reduce manufacturing costs of the new threaded bolt and which takes advantage of the existence of the threaded nut commercially available, which these new machined elements would need to be added to.

BRIEF SUMMARY OF THE INVENTION

The main objective of the present invention is that the threaded nut is divided into two or more parts and that are rapidly disengaged. This is achieved by two factors, being the first referred to the existence of such a geometry that will allow concentration of stress on the threaded nut while the second factor consists of the appropriate application of a load as to appropriately increase stress on the concentrator (2) thus producing disengagement (9 and 10). In general the threaded nut of rapid pull up has the same geometry (squared or hexagonal) that a conventional threaded nut (FIG. 1), but a notching (2) has been added to the supporting sides of the nut for a conventional or special wrench thus allowing concentration of stress, causing a crack at the end of the notching (7 and 8), and the path of the crack toward the surface of the thread favors breaking and disengaging of the piece in at least two portions (9 and 10). The notching in its preferred embodiment corresponds to a radial depth notch B on the face of the threaded nut or device (1) and according to the axial direction (along the threaded nut or the device), with a thickness A allowing the insertion of a wedge element (11 and 12) and at a such depth B that is near the surface where the thread is located. Increasing the length of the crack (7 and 8) is attained when progressively separating both faces (5 and 6) from the slot by inserting the wedge (11) between them. This process should be done promptly as to prevent formation of a barrier of material in the tip of the crack which plasticizes. Developing this process favors a fragile type of cracking. Thus fragments are separated and a rapid pull up is performed. This process does not last more than 5 seconds depending on the machine used to make the shear in the threaded nut. This threaded nut can be provided with an insert of other material (generally a polymer) which prevents the threaded nut or the from becoming loose when in operation and the material should be positioned in a specially defined bore (3).

The present invention captures the idea of rapidly breaking the threaded nut or device. In order to achieve the objective, some notches, which allow concentrating stress when a wedge is applied between them, have been placed on the outside and in normal direction to the flat sides of the threaded nut. Technically, this refers to that the beginning of a seam is created in the modality identified as 1c, which means that when the wedge is progressively inserted, the faces are separated and the crack increases in its length until breaking and totally disengaging the portions. This process of wedging is done by using a machine specially designed for that purpose and which has the appropriate shape on its mobile jaws matching the notches. This process is done in a rapid and safe manner thus allowing the separation of at least two parts of the threaded nut and consequently the threaded nut is easily pulled off from the threaded bolt. It is concluded that this process should not take longer than 5 seconds thus significantly decreasing the time of removal of the element which currently takes 60 seconds at best.

As to make the device more functional it has been provided with a number of accessories which significantly improve its operation.

1. Since one of the problems occurring during the operation of a threaded nut with a threaded bolt is the loosening of the nut, consequently it ceases meeting the objective of maintaining the elements together, a traditional method has been added. The objective of this method is to prevent the threaded nut or device from becoming loose by adding a polymer ring and positioning such ring in the outer lip of the thread nut. The ring is plastically stressed thus filling in all interstices existing between the thread of the bolt and the thread of the nut, thus producing such a pressure that the pieces are tightly connected.

2. In order to rapidly remove the threaded nut from the male member or bolt a sort of scissors has been designed. The scissors has two claws with such a geometry that allows a rapid positioning of the wedges placed on the claws over the notches. Operation of the rapid pull of threaded nut can be manual and/or assisted by mechanical elements such as pneumatic air and hydraulic, the latter modalities help to increase speed and effectiveness of removal of the fragments of the threaded nut.

3. The fast extraction threaded nut can have several arrays with respect to the position of notches created by the cracks which will separate the nut in two. The first of those configurations indicates that it is possible to have only two notches facing each other and positioned over the flat faces of the threaded nut. Such an array would be enough to split the faces but they can also be added to the other faces of the threaded nut, thus allowing a greater range of positions to place the tool or device to be used when placing the wedges, then making the pull off operation even more expedite.

4. The fast extraction threaded nut can be used with conventional washers commercially available without any inconvenience, i.e., the operation of the components is not disrupted.

5. Finally, it should be noticed that this system is also applicable to a S threaded nut presenting flat faces opposite each other in a regular form, that is, hexagonal, octagonal or squared section S threaded nut, etc.

The invention of the present patent application relates to a new type of threaded nut allowing a fast extraction and faultless operation. Fast extraction or pull out is achieved by placing notches that have such a geometry that allows access to the threaded nut in a safe manner (the nut will not break nor become loose when subject to operational loads) but which upon removal is not necessary to rotate, wherein it is only necessary to split the nut in two or more portions through a device provided with wedges acting upon the notches which force the nut to be separated in two or more portions. The benefit from the invention is the significant time saving achieved when extracting a large number of nuts thus increasing availability of the equipment. This threaded nut can be provided with an insert (3) of other material (generally a polymer) which prevents the threaded nut from becoming loose when in operation and said material should be positioned in a specially defined bore (3).

A more detailed explanation of the invention is provided in the following detailed descriptions and appended claims taken in conjunction with the accompanying drawings.

DETAILED DESCRIPTION OF THE INVENTION

The following is a detailed description and explanation of the preferred embodiments of the invention and best modes for practicing the invention. In reference to FIG. 1, an example allowing development of the present invention is illustrated. In particular, a front and back view of the fast extraction threaded nut is illustrated where a preferred modality of the invention is identified.

Figure 1:
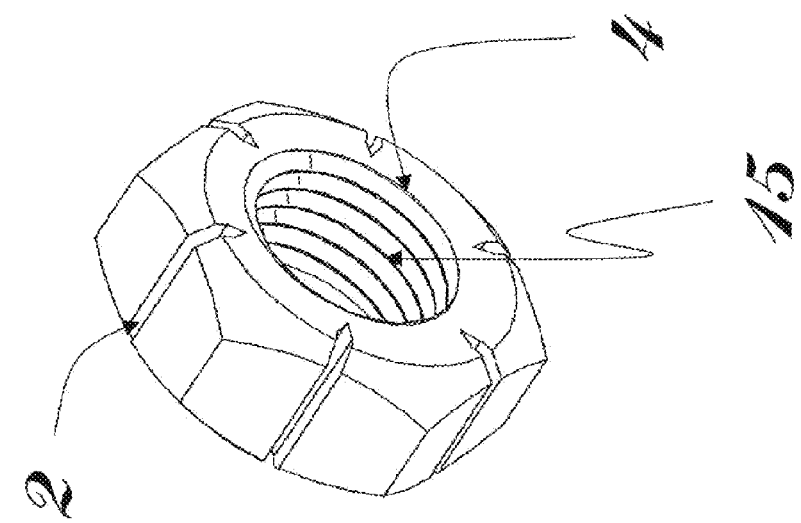
FIG. 1 shows a perspective view of the modalities of the present invention.
Figure 1:
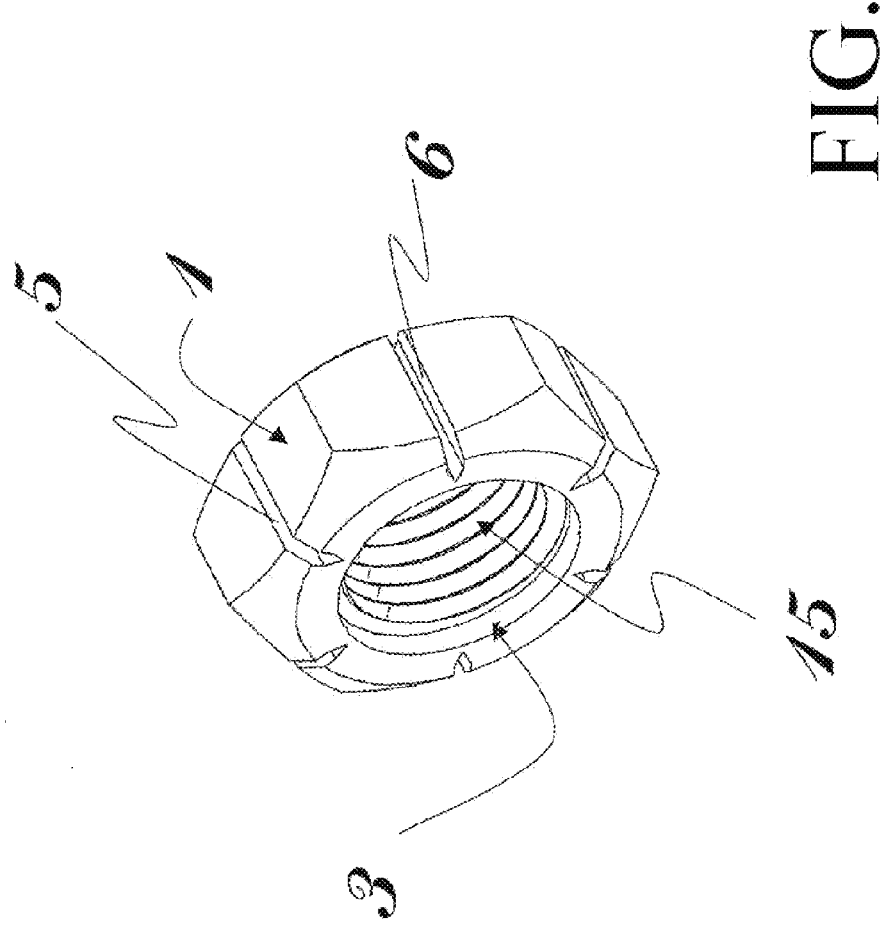

The fast extraction thread nut has flat faces (1) where the notches are made (2). Such notches (2) can have different shapes wherein the most typical shape in the initial zone is parallel faces (6, 7). Notwithstanding the aforementioned, these faces (6, 7) can create an angle that varies based on the shape of the wedge created with the notching (2) or as shown in FIG. 1, straight faces (6, 7) can end in a vertex generating an area of concentration of stress between the vertex and the axial bore of the fast extraction thread nut.

The threaded nut has a bore (3) wherein a ring preferably made of polymer rests which will allow for the fast extraction threaded nut to be securely adjusted to the threaded bolt or male member of the assembly, thus the fast extraction threaded nut could not be loosen and will make the different elements the nut secure to be tight and to not need further tightening. The threaded nut also is provided with a bore (4) of the threaded nut for the threaded bolt or male member and which has the conventional typical geometry known in the art of threaded nuts commercially available.

Figure 4:
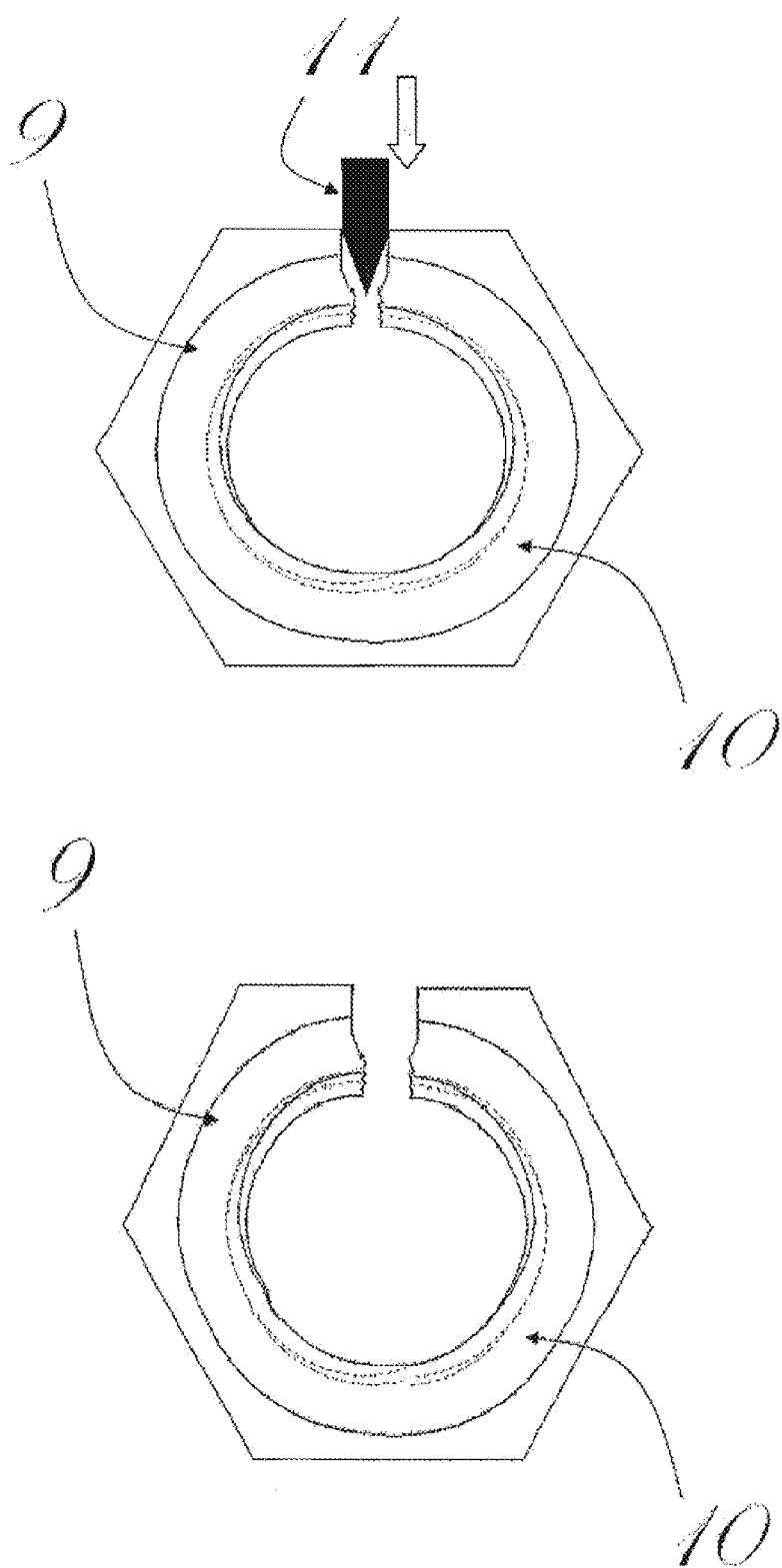
FIG. 4 shows the splitting process of the threaded nut with a notch.

FIG. 4 illustrates one of the embodiments of the present invention wherein one of the faces (1) has a notching (2) as to when introducing the splitting means (11) in the notching (2), the portion between the outer area of the notching and the inner area of the threaded nut is split thus generating an opening of the threaded nut which is sufficient to remove the nut from the threaded bolt or male member where the nut is resting.

Figure 5:
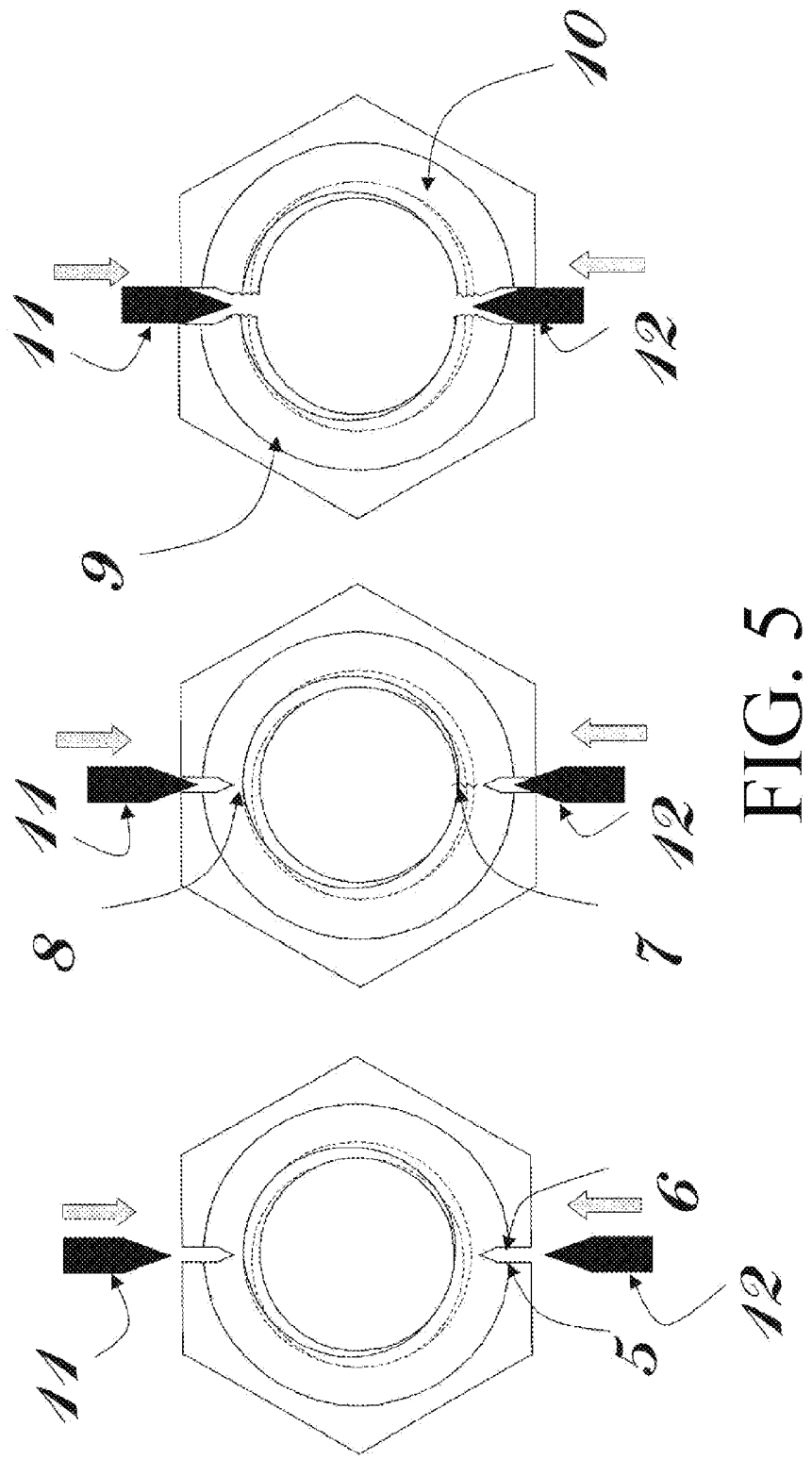
FIG. 5 shows the splitting process of the threaded nut with several notches.

As illustrated in FIG. 5 it is also possible to position notches in all faces. It should be noticed that the shape described for the notching clearly benefits when manufactured as only one single disc tooling on a typical conventional milling machine is sufficient, and can also be manufactured using other type of machine, either conventional or numeric control machine.

Figure 2:
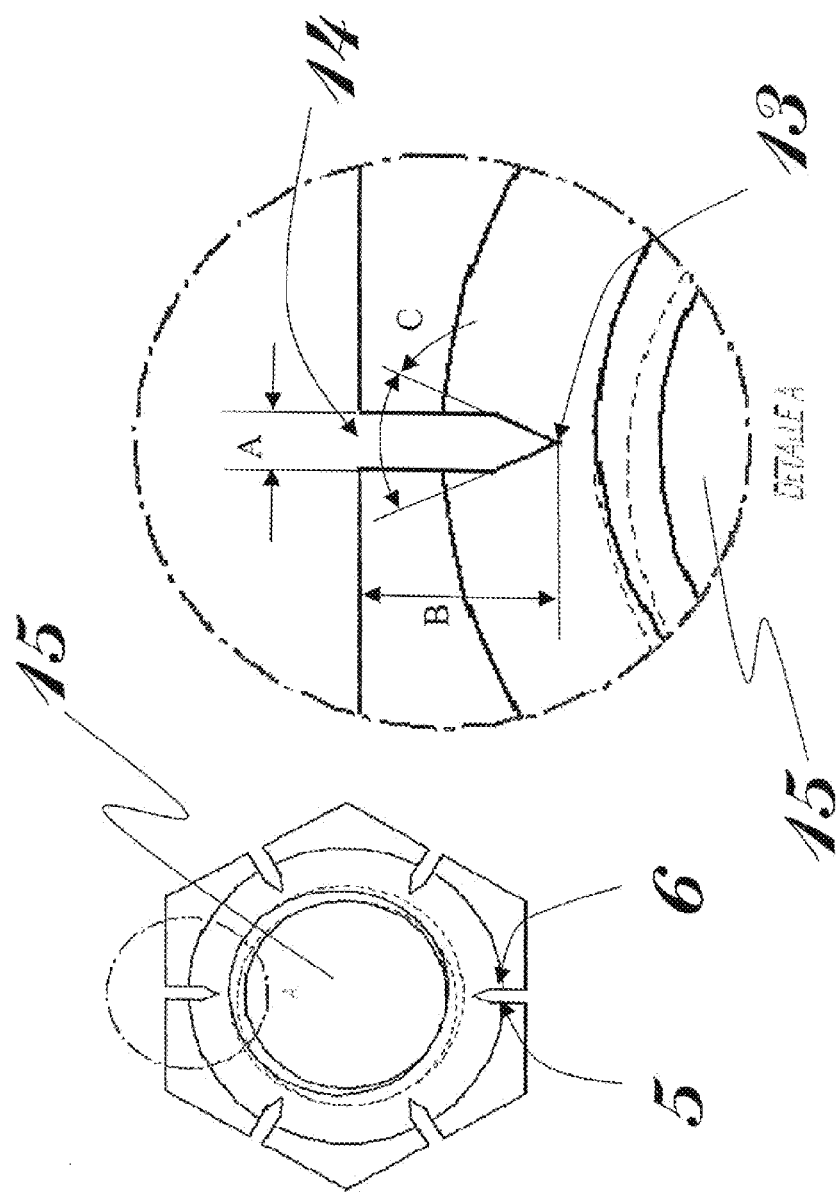
FIG. 2 shows a detailed view of the notching.

FIG. 2 shows an example of one embodiment of this invention where the notching area is detailed (2) and the dimensions of the notching are illustrated. Dimension A corresponds to the width of the notching whereas the preferred dimensions range from 0.1 mm to 10 mm, notwithstanding, the specific dimensions are defined based on the diameter of the thread of the threaded nut, ranging from 0.1% to 20%; for a thread nut with nominal diameter of 50 mm. Dimension A is preferably of 2 mm which is exclusively given to the ease of manufacturing and availability of the tool. It is possible to have lesser dimensions, to a minimum of 0.1 mm through other process such as electro-discharge, a laser type cutting, and also by plasma. The notching angle is defined by dimension C which preferably ranges from 10° to 45° as to have a better performance and it should be as acute as possible in its end thus preventing the round end of the shearing tool. The round end is created when the operation is performed using a shearing disc to wear the ends thus rendering a round profile in the tip. This restriction does not occur or it is minimized when other methods described herein are used, such as shearing by electro-discharge, laser, and plasma. Finally, the most important measure is depth B. The values of this magnitude are directly dependent on the size of the threaded nut and on the properties of the material wherein its value is derived from standard dimensions of threaded nut raging from 5% the nominal diameter of the thread run of the threaded nut to 25% of the diameter. These are the preferred values although other values might be available depending on the resistance of the material.

Figure 3:
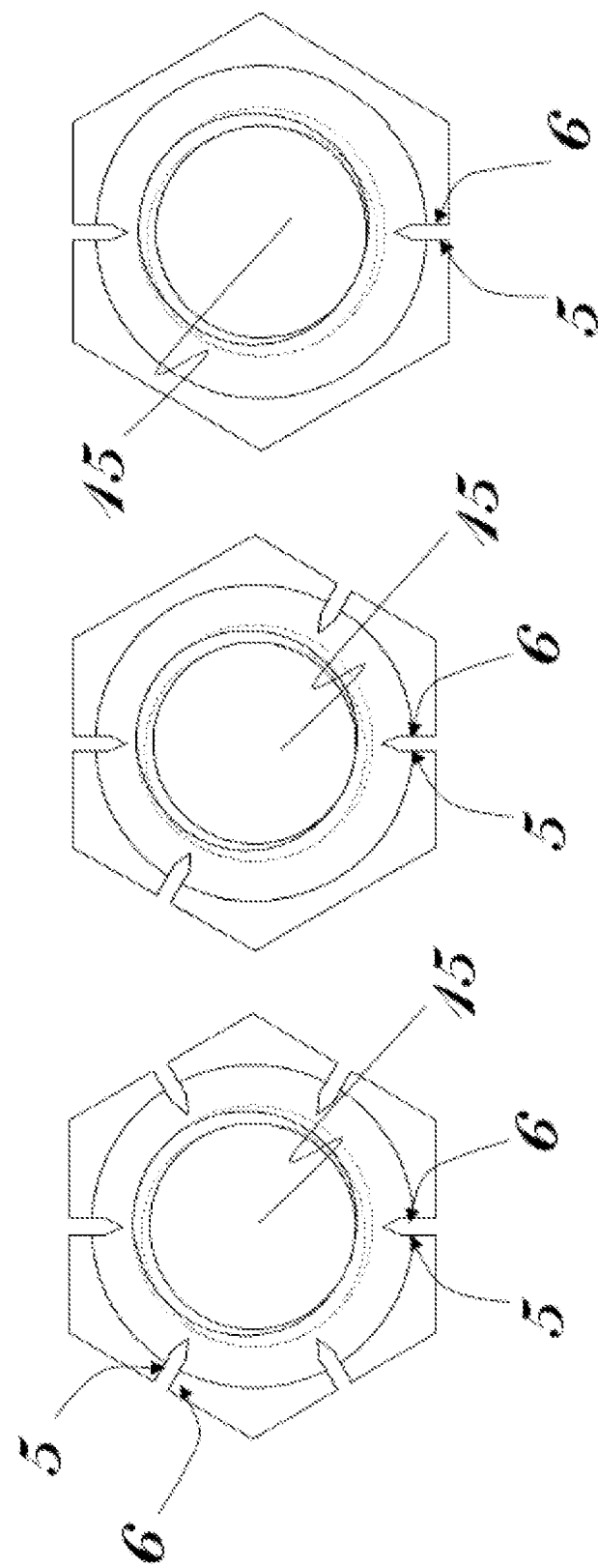
FIG. 3 also shows different alternatives of geometries of notching.

FIG. 3 shows different alternatives of preferred geometries. Three alternatives are shown as to application of notching. If the threaded nut is accessible through any position, two notching facing each other should suffice. The other two alternatives allow access from other positions of the jaws which will split open the threaded nut.

As mentioned before, FIG. 4 illustrates the alternative of the present invention using one single notching.

FIG. 4 shows the sequence of splitting or disengaging of the threaded nut. None of the cases has shown the threaded bolt or male member for the simplicity of the drawing and as such element is not the subject of the present invention. An array of parallel faces is shown provided that it is not the only alternative as different angles might exist between the faces. The element (11 and 12) refers to the wedges to be inserted in the notches of the threaded nut. The angle of the wedge is only restricted as it should allow penetration between the surfaces (5 and 6), where the angle is preferably ranging from 10° to 35° as to facilitate insertion. When the elements (11 and 12) move in a synchronized manner facing each other through a device providing such movement, two areas of stress concentration (7 and 8) resulting from the vertex (13) in the notching are produced when inserting the wedge thus creating a seam that will grow as the wedge is progressively inserted. When the wedge has reached enough depth and is such limited by the internal bore (15) of the fast extraction threaded nut where the threaded bolt rests, the splitting of the threaded nut occurs in two portions (9 and 10), thus rapidly disengaging the connection system. The notching (2) has a maximum section (14) in the outer part of the fast extraction threaded nut and one minimum section (13) which is typically located prior to the axial bore (15) at a certain distance allowing the generation of an area of increase in the level of stress (7, 8) wherein such cams when split (5, 6) produce a seam which grows in length until reaching the inner surface of the axial bore (15) where common tightening mean is formed thus generating the split of the fast extraction threaded nut in two parts.

Tests conducted have shown values ranging from 3 to 5 seconds in the application time of the tool depending on the speed with which the wedges move.

Figure 7:
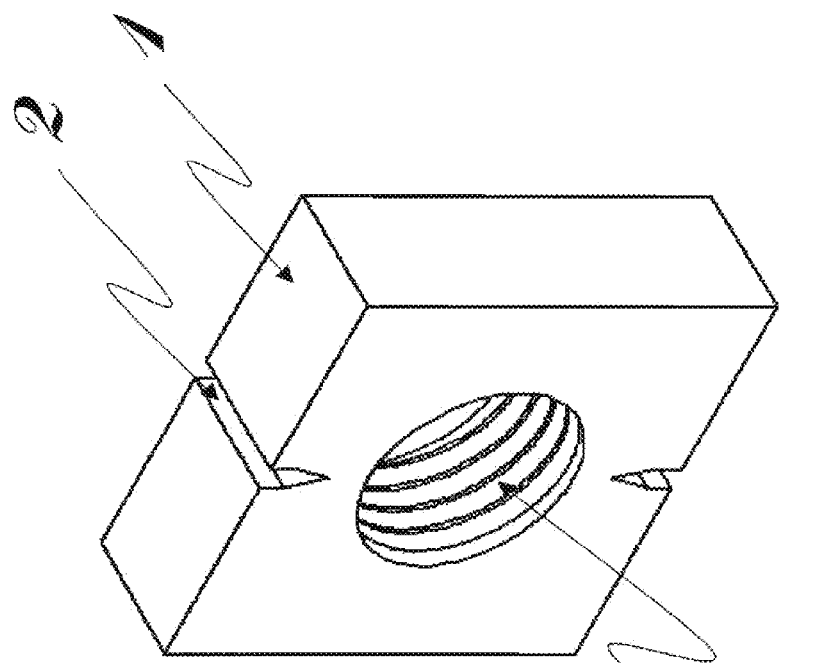
FIG. 7 shows another modality of the device of the present invention which is a squared nut with two notches.
Figure 6:
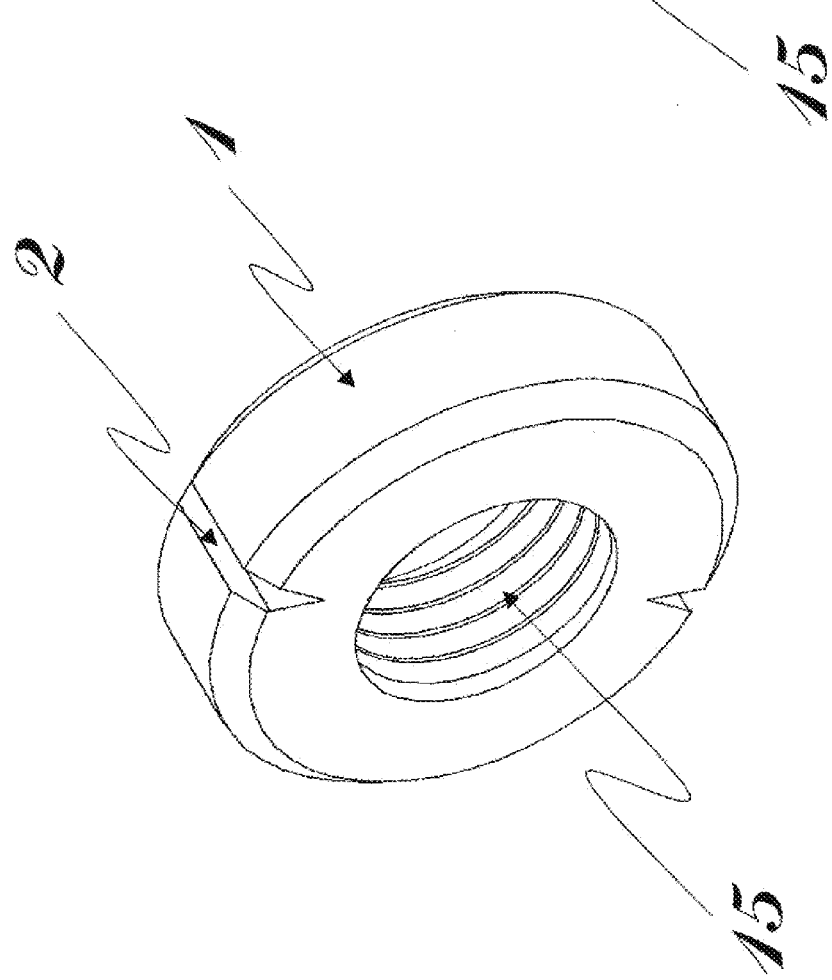
FIG. 6 shows a modality of the device of the present invention which is a low height cylinder or milled face skirt with two notches.
Figure 8:
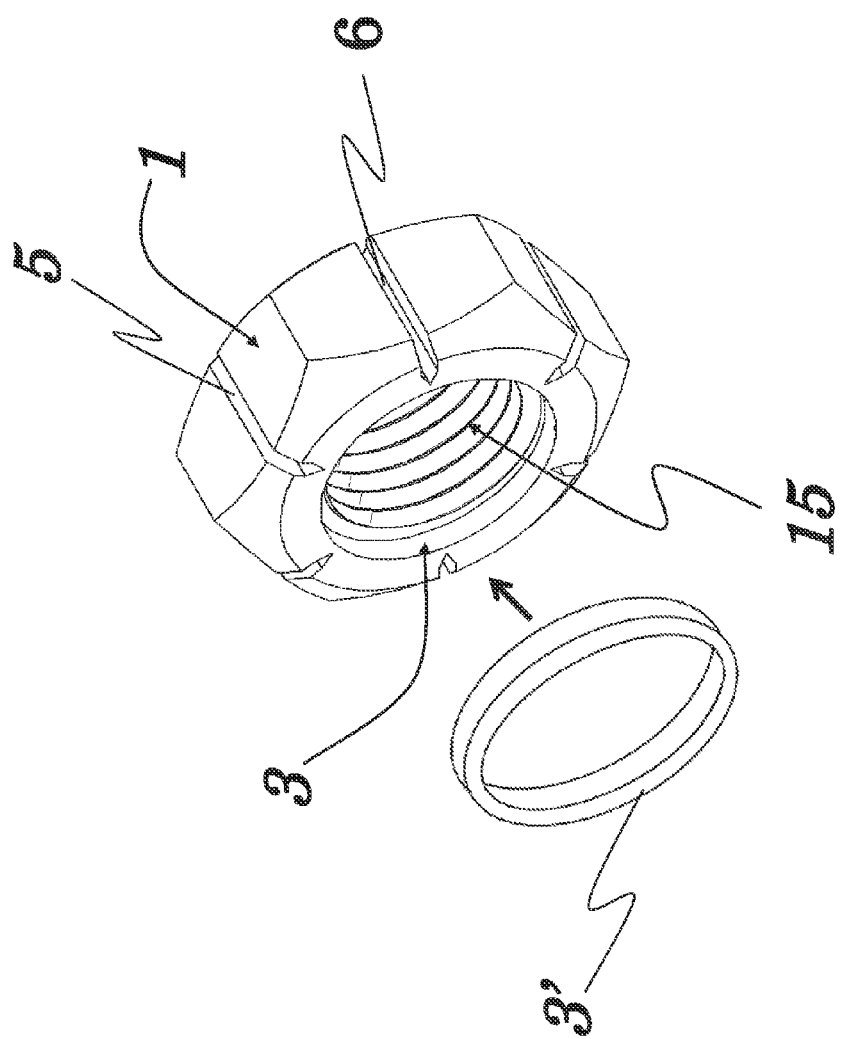
FIG. 8 shows an embodiment of the nut with an insert preventing the nut from becoming loose when in operation.

While is true that the invention preferably relates to a nut, the female member could be a round skirt milled in the outer part, that is, without flat faces thus allowing tightening on a threaded bolt or male member and which has one or several notches as to create the split and to be rapidly removed from the male member where it is connected (see FIG. 6). Also, the invention could be implemented using a squared nut as shown in FIG. 7 where faces are facing each other and have the notching as to facilitate splitting. In the case herein two notching face each other although it is also possible to have notching in all faces as is the case with a hexagonal nut.

Similarly, the joining element does not necessarily need to be threaded as it is usual the case in nuts and bolts but can also include all means known in the art.

Although embodiments of the invention have been shown and described, it is to be understood that various modifications, substitutions, and rearrangements of parts, components, and/or process (method) steps, as well as other uses of the Fast Extraction Threaded Nut, can be made by those skilled in the art without departing from the novel spirit and scope of this invention.

What is claimed is:

1. A fast extraction threaded nut intended to be used on a threaded bolt or male member wherein at least in two of its outer faces comprises notches of variable cross-section wherein the maximum cross-section of the notches is positioned in an outer area and the minimum cross-section is positioned prior to the axial bore wherein the notches allow weakening of the threaded nut or female member only when the threaded bolt or male member is pulled out and the threaded nut is kept intact when the threaded nut is subject to high operational loads and installed in high tonnage, continuous operation machinery, including grinding mills for mineral, such that when compressing said fast extraction threaded nut and said male member with tightening means of common geometry comprising threads or fillet nut means, the notches are formed by a radial depth cut (B) on the outer faces of the threaded nut or female member according to the axial direction along the threaded nut or female member in which the radial depth cut (B) is between 5% to 25% of the nominal diameter of the threaded nut or female member, each of the notches having a width (A), formed by at least two walls, in which the width (A) is between 0.1% to 20% of the nominal diameter of the threaded nut or female member, each of the notches having a bottom end angle (C) which has a sharp projected end, in which the bottom end angle (C) is between 10° to 45° in order to obtain the highest level of stress wherein into each notch are inserted two wedging elements whose angle is between 10° to 35° which are moved in a synchronized manner and facing each other, thus creating a seam and producing an area where the level of stress increases, thereby producing a crack that grows until reaching the inner surface of the central bore.

2. The fast extraction threaded nut as defined in claim 1 wherein said nut is a hexagonal nut.

3. The fast extraction threaded nut as defined in claim 2 wherein said notches of said hexagonal nut comprise two notches positioned in faces facing each other.

4. The fast extraction threaded nut as defined in claim 2 wherein said notches of said hexagonal nut comprise four notches positioned in faces facing each other.

5. The fast extraction threaded nut as defined in claim 2 wherein said notches of said hexagonal nut comprise six notches positioned in each of the faces.

6. The fast extraction threaded nut as defined in claim 1 wherein said nut is a squared head nut.

7. The fast extraction threaded nut as defined in claim 6 wherein said notches of said squared head nut comprise two notches positioned in faces facing each other.

8. The fast extraction threaded nut as defined in claim 6 wherein said notches of said squared head comprise four notches positioned in each of the faces.

9. The fast extraction threaded nut as defined in claim 1 wherein said nut is a milled face skirt and said notches of said milled face skirt comprise two notches positioned in faces facing each other.

10. The fast extraction threaded nut as defined in claim 1 wherein the axial bore of the threaded nut includes an outer insert made from other material as to secure the nut when in operation.

11. The fast extraction threaded nut as defined in claim 10 wherein said insert is made of polymer.

* * * * *